United States Patent [19]

Thomas et al.

[11] 4,158,280
[45] Jun. 19, 1979

[54] ROTARY LAWN MOWER

[75] Inventors: George A. Thomas, Des Moines; Clair D. Splittstoesser, Ankeny, both of Iowa

[73] Assignee: AMF Incorporated, White Plains, N.Y.

[21] Appl. No.: 819,747

[22] Filed: Jul. 28, 1977

[51] Int. Cl.² ............................................ A01D 53/06
[52] U.S. Cl. ........................................ 56/202; 56/16.6
[58] Field of Search ................ 56/13.4, 199, 202, 203, 56/16.6

[56] References Cited

U.S. PATENT DOCUMENTS

| | | | |
|---|---|---|---|
| 2,942,396 | 6/1960 | Farnam | 56/13.4 |
| 2,955,402 | 10/1960 | Strasel | 56/13.4 |
| 3,037,339 | 6/1962 | Nicholson | 56/202 |
| 3,178,872 | 4/1965 | Swindler | 56/13.4 |
| 3,192,692 | 7/1965 | Slemmons | 56/13.4 |
| 3,367,091 | 2/1968 | Weiland | 56/13.4 |
| 3,716,977 | 2/1973 | Jackson | 56/202 |
| 3,934,392 | 1/1976 | Morry et al. | 56/202 |
| 3,971,198 | 7/1976 | Lane | 56/202 |
| 3,974,631 | 8/1976 | Rhodes | 56/202 |
| 3,987,606 | 10/1976 | Evans | 56/13.4 |
| 4,015,406 | 4/1977 | Urh et al. | 56/202 |
| 4,047,368 | 9/1977 | Peterson | 56/202 |
| 4,054,023 | 10/1977 | Carpenter | 56/202 |

*Primary Examiner*—Louis G. Mancene
*Assistant Examiner*—Paul J. Hirsch
*Attorney, Agent, or Firm*—George W. Price; Walter Lewis

[57] ABSTRACT

A walk-behind rotary lawn mower having a sliding drawer type grass catcher box mounted directly on the rear part of the deck behind the engine and between the U-shaped handle and rear wheels. A cover fixedly mounted on the handle closes the top of the box. A vertical tube carries the cut grass-air mix from below the mower deck up to against the cover. The cover is provided with an integral arcuate chute for causing the cut grass-air mix to swirl around in the box so the grass can fall by gravity into the box. The tube, cover and box are a closed air system and the air is exhausted to the atmosphere through vents in the cover which face in directions away from a user positioned behind the mower. The tube, cover and box are constructed from air impermeable plastic, and the box can be lined with a conventional store-bought throwaway type plastic garbage or leaf collecting bag.

2 Claims, 10 Drawing Figures

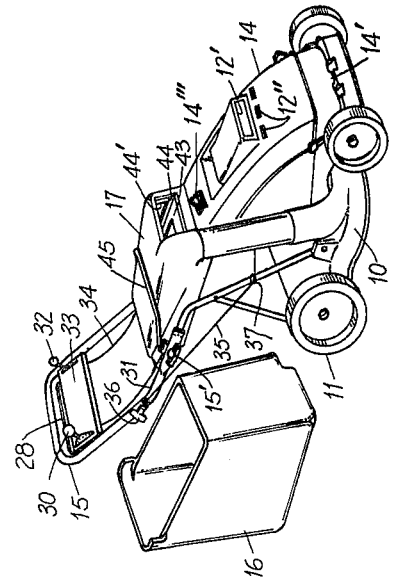
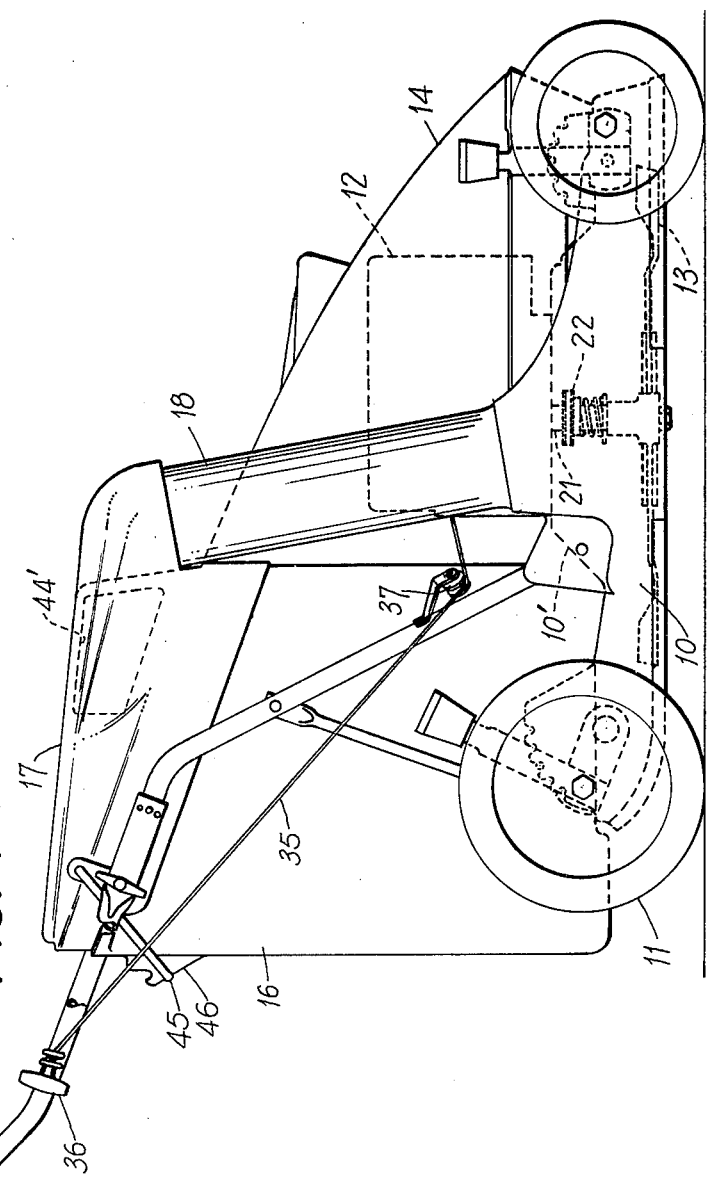
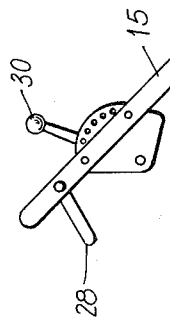
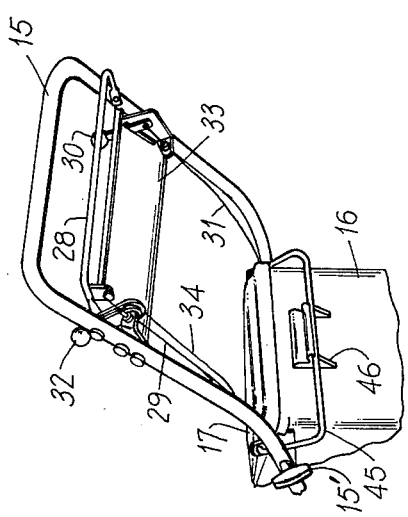

ROTARY LAWN MOWER

This invention relates to improvements in rotary lawn mowers of the walk-behind type, and more particularly, to an improvement in catching and disposing of the grass clippings.

It is an object of this invention to provide an improved and low cost grass catching and disposal system for walk-behind rotary lawn mowers.

Briefly, in the invention, a plastic box, which may or may not be lined with a throw-away type plastic bag, is slidably positioned on the rear deck of the mower behind the engine and between the U-shaped handle and rear wheels. The box slides in or out like a cabinet drawer. A plastic combination box cover and air-grass mix separator is fixedly mounted on the handle and a plastic tube conveys the grass clippings from beneath the mower deck up to and against the combination box cover and air-grass mix separator. The plastic tube, cover-separator and box comprise a closed air system for obtaining high air flow from the mower to enable lifting of the cut grass from the mower and into the box where its swirls around until it falls by gravity into the bottom of the box.

The invention will be better understood by considering the four sheets of drawing in which:

FIG. 1 is a side view of one commercial form of the invention;

FIG. 3 is a partial rear perspective view;

FIG. 4 is a front perspective view showing the box removed;

Figure 2:
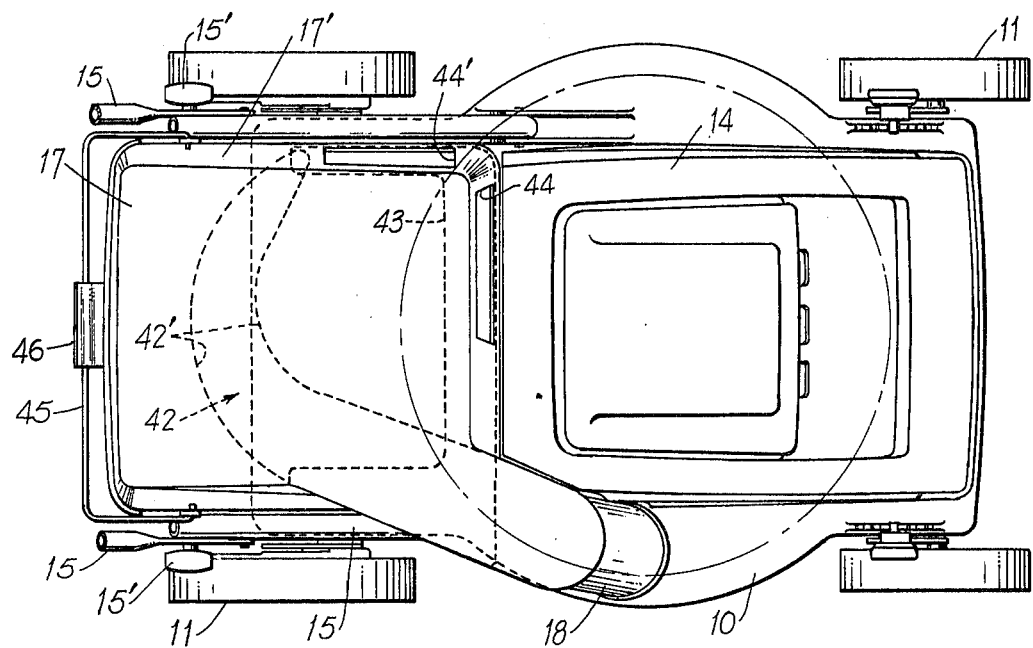
FIG. 2 is a top plan view.

Now for a detailed description of the invention taken in connection with the drawings. As shown therein, the mower comprises a deck 10, wheels 11 at the four corners thereof, a power unit such as a gas engine 12 on the top of the deck, and a fan acting type grass cutting blade 13 below the deck which is driven by the power unit. The power unit is covered by an engine shroud 14, and a U-shaped handle 15 is provided with which the walk behind user guides the mower. Either the front or rear set of wheels can be powered by the engine to drive the mower, or it can be an operator push type mower.

Figure 5:
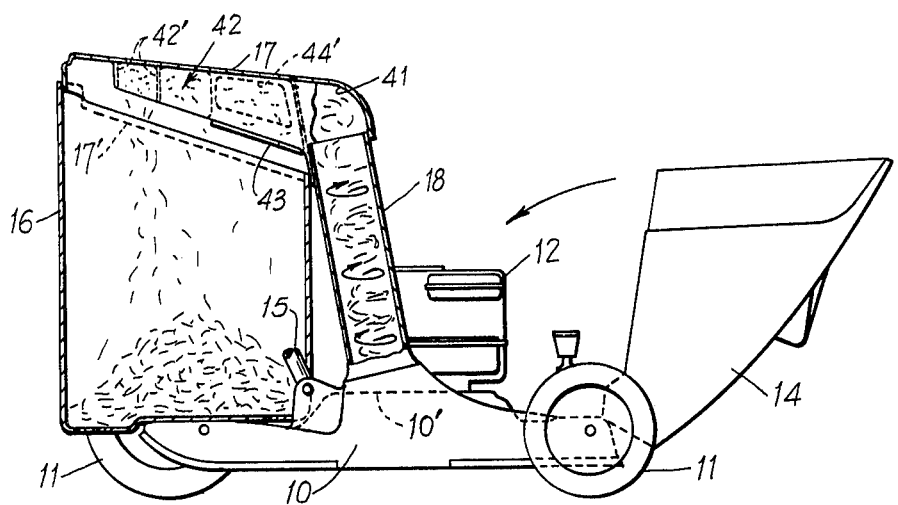
FIG. 5 is another side view showing the motor shroud hinged open.
Figure 10:
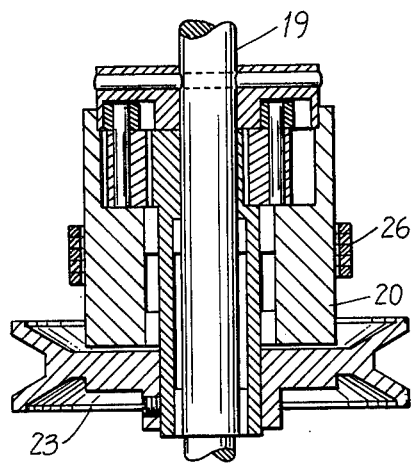
FIG. 10 is a sectional view through the speed reducer 20.

In the invention a plastic grass collector box 16 is slidably positioned right on the rear of the mower deck 10 between the handle 11 and behind the engine 12. In FIG. 1 the box is latched closed with respect to a box cover 17 fixedly mounted on the handle 15. In FIG. 4 the box is shown removed. The box slides in and out on the rear of the mower deck like a slide-out drawer. In FIG. 5 the shroud 14 is shown hinged open to afford access to the engine. As will be described hereinafter, the cover 17 is also an air-cut grass mix separator, see FIGS. 2, 5 and 6. The cut grass is lifted from below the mower deck to against the cover-separator 17 and therefor into the box 16 by a vertical tube 18. The parts 16, 17, 18 are all constructed from air impermeable plastic material and comprise part of a closed high air flow system to assist the blade 13 in lifting the cut grass from below the deck into the box.

Figure 7:
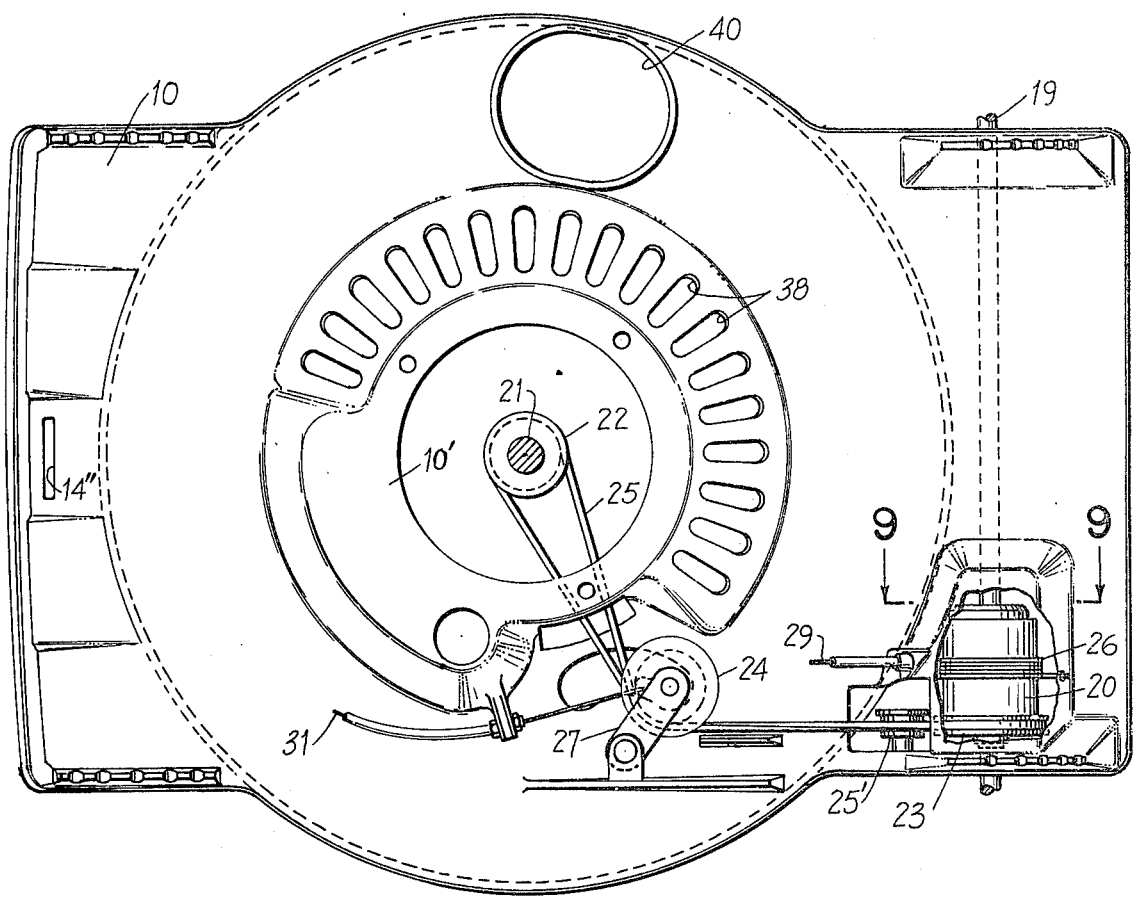
FIG. 7 is an enlarged broken away top plan view of the mowor to better show the speed reducer, clutch, pulley-belt system, and speed selector means.
Figure 9:
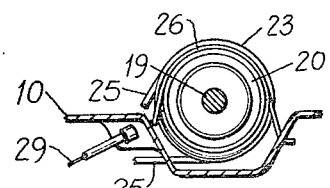
FIG. 9 is a sectional view taken along the section line 9—9 of FIG. 7.
Figure 8:
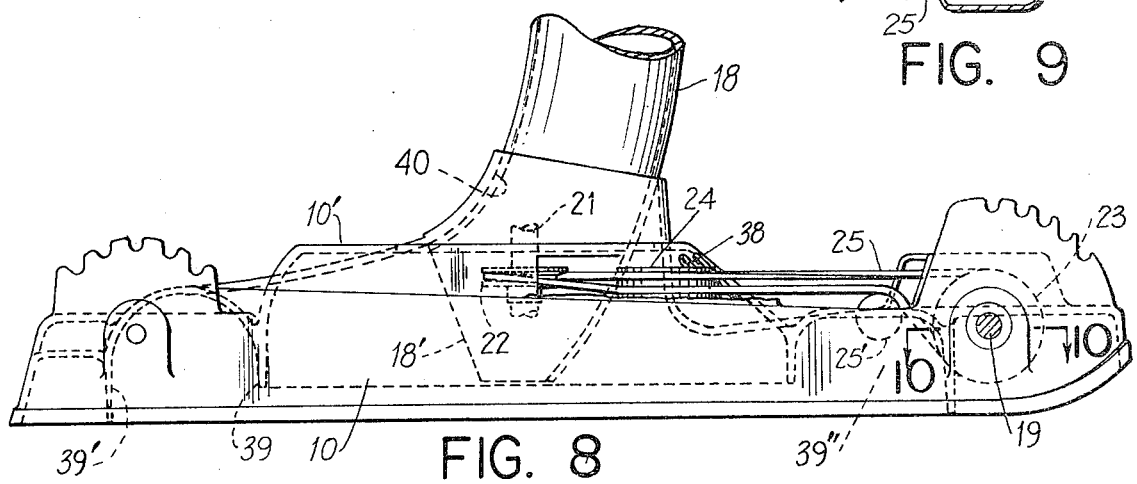
FIG. 8 is a side view corresponding to FIG. 7 to better show various portions of the mower deck including its below deck cut grass annulus.

Referring now also to FIGS. 7-9, in the preferred commercial embodiment of the invention the rear wheels are powered. The rear wheels' axle 19 has a coaxial speed reducer 20 mounted thereon which affects a 6 to 1 speed reduction between the RPM of the engine shaft 21 and the rear wheel' shaft 19. Power is applied to the axle 19 through the speed reducer 20 by a pulley-belt drive system comprising a pulley 22 on motor shaft 21, a pulley 23 on the speed reducer 20, a pair of idler pulleys 24 between pulleys 21 and 23, and a pulley belt loop 25 interconnecting the three pulleys 22, 23, 24.

When the engine is running, the pulley-belt system is running also, but the axle 19 does not rotate until a wrap-around spring clutch 26 is engaged. When clutch 26 is engaged, the shown outer housing of the speed reducer 20 is fixed against rotation, after which its internal parts can then operate to transmit rotation from the pulley 23 to the axle 19. When the clutch 26 is disengaged, then the outer housing of the speed reducer 20 is free to spin with the pulley 23, but the internal parts of the speed reducer are ineffective to turn the axle 19.

Thus far, what has been briefly described is a 6 to 1 speed reduction from the shafts 21 to 19, and a clutch to control the drive and no drive condition of the shaft 19. However, the mower has additional controls, comprising a speed selector for the axle 19. This resides in the double idler pulley 24 which can swing left to right on an arm 27. The pulley 22 actually comprises a V-shaped pulley of two spring biased halves, see FIG. 1, and the belt is also V-shaped. When pulleys 24 are allowed to swing to the right, tension on the belt is relaxed. Therefore, the belt can ride along the outer perimeter of pulley 22 to pick up the speed in axle 19. However, as the pulleys 24 are swung to the left, the belt 25 is tightened. So, it runs deeper in the pulley 22 which effects a speed reduction at the shaft 19. The roller 25' adjacent pulley 23 is simply an idler that keeps the belt off the deck 10, see FIG. 8.

The just briefly described speed reducer 20, clutch 26, pulley-belt system, and speed selector means do not comprise part of the instant invention, but are the inventions of George A. Thomas and C. Dean Peterson, more fully described in pending patent application Ser. No. 846,233 filed Oct. 27, 1977 and assigned to the same assignee as the instant invention. However, in order to complete the present brief overall description of the mower, it should be said that clutch 26 is controlled by a "dead man" type clutch bar 28 (see FIGS. 1, 3) at the upper end of the handle. The bar 28 operates the clutch through a cable 29. Squeezing bar 28 towards the upper end of handle 15 applies the clutch to drive the rear wheels and releasing the bar disengages the clutch. Also positioned at the upper end of handle 15 is a speed selector knob 30, see FIGS. 1 and 3. The knob 30 moves the pair of pulleys 24 to left or right through a cable 31. Pushing knob forward (away from the operator) increases the speed, and pulling the knob back slows down the speed. There is one other control knob 32 at the control panel 33 at the top of handle 15. This is the engine throttle control for start, fast to slow and stop of the engine per se. The knob 32 controls the engine through a cable 34. Also positioned on or alongside the handle 15 is an engine pull start cord 35 having a handle 36 at the upper end, the cord progressing therefrom around a roller 37 to the engine.

Referring now particularly to FIGS. 7 and 8, the deck has a raised generally cone-shaped, flat-topped, central portion 10'. The engine is mounted on the top of part 10' and air vents 38 are formed about the engine in the side walls of the cone-shaped deck part 10'. Beneath the deck 12 are two integral depending spaced skirts 39, 39'. Together they define a rather confined torus or annulus 39" beneath the deck within which the cut grass is moved in circular fashion by the fan action of the blade in a clockwise direction (see FIG. 7) for discharge through a discharge opening 40 in the deck. The lower end of tube 18 fits in this opening 40 and has a forwardly curved scoop portion 18' to assist the grass to change direction from the horizontal to the vertical. The vents 38 bring in additional amounts of air to beneath the deck so that there is high quantity air flow in the annulus 39" and up the tube 18 to ensure passage of the cut grass all the way up tube 18 to against the cover-separator 17. The concentrated and high air flow, due to the vents 38, annulus 39" and the design of the blade 13, is successful in lifting the cut grass all the way up the tube 18 because the latter is also part of a closed air system 18, 17, 16. The blade 13 as is well-known in the art, has outer leading cutting edges, and outer upturned trailing edges. The trailing edges give a fan action to the blade to make the grass stand up to be cut, and then move the cut grass around in circular fashion to be discharged from below the deck through the discharge opening 40.

Figure 6:
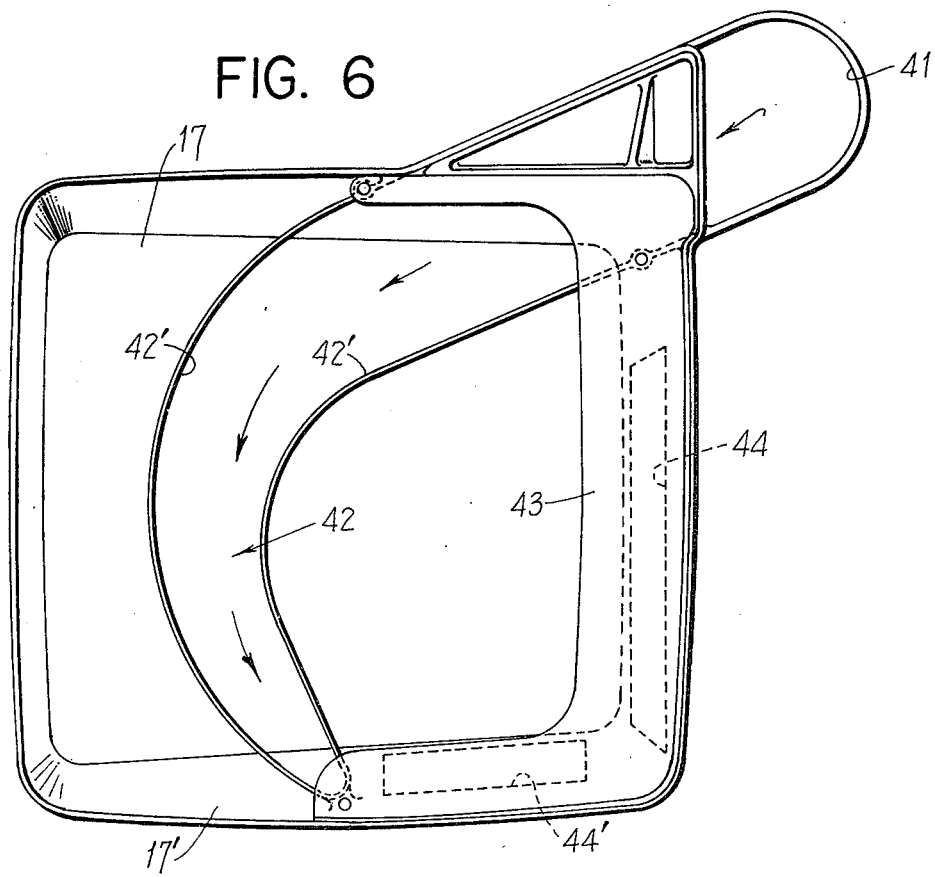
FIG. 6 is an enlarged bottom plan view of the combination box cover and air-cut grass mix separator.

Details of the cover 17, such as its air-cut grass mix separator feature, will now be described in connection with FIGS. 2, 5 and 6. The cover 17 has a flat top and is generally square in top plan view and is bounded along all four edges by an integral depending flange or skirt 17'. At the front corner thereof on the same side of the mower as the tube 18 and discharge opening 40, the cover has an integrally formed inlet opening 41. The upper end of tube 18 fits in inlet opening 41. Cover 17 also has an arcuate chute 42. Chute 42 is defined by a pair of spaced arcuate side walls 42' depending integrally from the top of cover 17. That is to say, chute 42 is closed at the top by the cover 17, but open at its bottom along the entire length thereof. Chute 42 extends from inlet opening 41 in an arc across the box 16 to the opposite side of the mower. A baffle 43 partially closes the bottom of the cover along the skirt 17' at the front half of the cover.

The inlet opening 41 is curved to change direction from the vertical to the horizontal. Thus, the air-cut grass mix shooting up the tube 18 strikes against the cover 17 and moves in an arc along the curved chute 42. This causes the air-cut grass mix to swirl about the box 16. Vents 44, 44' are provided in the front of skirt 17' and the side opposite from inlet opening 41. These vents face in directions away from the mower user who would be standing behind the mower at the hand controls 28, 30, 32. The vents 44, 44' are for venting the air of the air-cut grass mix to the atmosphere. However, because of the swirling action imparted to the air-cut grass mix, before the air is vented the mix has swirled around sufficiently to give the cut grass a chance to settle out and fall into the box, so that no grass leaves the enclosure 16, 17 with the vented air.

As seen from top plan view, the mower deck 10 is generally rectangular in shape and its length (fore and aft direction of movement) is about twice its width. The engine is positioned on the deck at about the central rear portion of the front half of the deck. The box 16 sets directly on the top of the back half of the deck. The box is generally square and closed at all four sides and the bottom thereof, but open at the top. The top, of course, is closed by the cover 17 when in the position illustrated in FIG. 1. In this position of the box it is latched in mower mounted position by a latch 45. As best seen in FIGS. 1 and 2, the latch 45 is a U-shaped piece pivoted at its ends off the handle so that it can be swung down to catch on a handle 46 of the box. In box unlatched position, the latch bar 45 is merely flipped onto the top of cover 17 as shown in FIG. 4. When the box is unlatched, it can be slid out off the deck to the position shown in FIG. 4, and its contents then dumped. Alternately, the box can be lined with a cheap disposable bag, and when it is full, the bag opening tied closed and the box contents simply lifted out by removing the bag. So, a very inexpensive grass collecting and disposal system is provided by the instant invention.

In addition, it should be noted that, since the box 16 rests between the handle 15 and rear wheels 11 and behind the engine 12, it gives good weight distribution and added traction to the rear wheels. With the box located at the back of the mower between the wheels, it is merely occupying space that otherwise would go unoccupied, since that space is there in any event because of the need for a handle at the back of the mower. Also, though, this location of the box gives an out-of-the-way, nonprotruding grass collector, as contrasted to those of the prior art, which if they extend rearwardly do so for a considerable length, and if they come out along the side of the mower, then prevent one from coming in real close to shrubs and the like from either side of the mower.

By contrast, in the invention it is possible to get in real close to mow grass contiguous to shrubs, from either side of the mower. In this connection, although, the deck is generally rectangular in plan view, the torus or annulus 39" does protrude slightly along the sides of the mower. However, by considering FIG. 2, it will be seen that this makes it possible to bring the wheels 11 in real close to the edges of grass being cut and for the blade 13 to actually cut even the grass lined up with the wheels along either side of the mower.

FIGS. 4 and 5 show the engine shroud 14 closed and opened, respectively. Shroud 14 gives the mower a nice appearance and further serves to dampen engine noise. The front bottom edge of shroud 14 is provided with a tab 14' that enters a notch 14" (see FIG. 7) in the deck 10. At its rear the shroud 14 is latched shut by a latch 14''' mounted off the front portion of the fixed handle mounted cover 17. The shroud has engine air intake openings 12', 12", see FIG. 4. On the same side of the mower as knob 32 the shroud 14 abuts the box 16. However, as seen in FIG. 1, on the other side of the mower, the shroud 14 does not quite do this, but leaves a gap (between box 16 and tube 18) so that air can enter here for the vents 38 in the deck.

It was heretofore stated that the parts 18, 17, 16 comprise part of a closed air system. Thus, they are air impermeable, so that the air flow is high, concentrated, and along the path heretofore discussed. To this end they are constructed from air-impervious plastic. Constructing these parts from plastic has the additional advantage that they can be readily fabricated at low cost and also be made lightweight. For example, the box 16 is made from lightweight plastic so that when one is moving it to discard its contents, one is really not lifting much more than the weight of its contents.

In a commercial form of the invention presently on the market, the Horsepower of engine 12 is 4 H.P., and the blade 12 makes a 22" cut. However, it will be obvious to those skilled in the art that these figures can be somewhat more or less depending upon the particular design selected such as several H.P. and a cut of about 1½ to 2 feet. For the same commercial 4 H.P., 22" cut mower the box 16 had a capacity equivalent to a 30 gallon (2½×3 ft. size) commonly available household type plastic trash can liner; but here again, the exact size of the box will also depend on the particular design selected.

The mower herein described has been previously disclosed in copending George A. Thomas Design Pat. No. 249,690, granted Sept. 26, 1978, however, it will be appreciated by those skilled in the art that the invention can be practiced without restriction to the particulars of the design. In addition, other advantages of the illustrated invention briefly are that it is safe since with no side opening discharge from the deck, there is less risk for stones or other hard objects to come flying out sideways from the mower. That is to say, with the illustrated closed system, any such debris will be more apt to end up in the box 16. The swirling movement that the combination cover-separator 17 imparts to the air-cut grass mix ensures that the grass cuttings are evenly distributed throughout the box instead of piling or bunching up at one corner or side thereof, and the almost cyclonic swirling action also compacts the grass cuttings as they settle into the bottom of the box. Finally, although the controls per se are not part of the instant invention, the "dead man" type control bar 28 ensures that the drive to the wheels 11 for moving the mower is shut off if for any reason the mower has to be momentarily unattended. That is to say, the instant one's hands are taken off the handle 15, the bar 28 has to be released, which means that the clutch 26 is instantly released so that mower travel is immediately stopped. When not in use, the mower handle 15 can be folded at its central portion by loosening wing nuts 15'. The back half of handle 15 can then be folded forwardly until it comes down to rest in the engine shroud 14. Thus, in stored position, the mower occupies only about half its illustrated overall length.

We claim:

1. In a rotary lawn mower, a mower deck, said deck having a transverse dimension and a longitudinal dimension, said longitudinal dimension extending in the direction of travel of said mower and being about double said transverse dimension, said deck being generally rectangular shaped in top plan view, a ground engaging wheel mounted at each corner of said rectangular shaped deck for moving said mower in either direction of said longitudinal dimension, a grass cutting blade positioned beneath said deck, a power unit mounted on the top of said deck for driving said blade, said power unit being centrally positioned on said deck proximately at the rear portion of the forward half of said deck, a generally U-shaped handle mounted to the rear half of said deck, said handle extending rearwardly from said mower at an angle of approximately 45 degress, a receptacle cover mounted to said handle, said cover being vertically spaced above the rear half of said deck, said cover being generally square in top plan view, an inlet opening formed in one corner of said generally square cover at one side of said mower, a discharge opening formed in the top of said deck at the same side of said mower as said inlet opening, a generally vertical tube extending from said discharge opening to said inlet opening for conveying grass cut by said blade beneath said deck up through said discharge opening and then through said inlet opening to up against the underside of said cover, a grass catching generally square shaped box being directly positioned on the rear half of said deck behind said power unit and between opposite sides of said handle and opposite rear wheels of said mower and directly beneath said cover, said box being open at the top and directly slidable on said mower deck in drawer-like fashion in either direction of said longitudinal dimension whereby in the mounted position of said box on said mower said open top is closed by said cover, latch means for locking said box in cover closed position, and said box being entirely removable from said mower upon disengagement of said latch means for emptying the contents of said box.

2. In a rotary lawn mower, a mower deck, said deck having a transverse dimension and a longitudinal dimension, said longitudinal dimension extending in the direction of travel of said mower and being about double said transverse dimension, said deck being generally rectangular shaped in top plan view, a ground engaging wheel mounted at each corner of said rectangular shaped deck for moving said mower in either direction of said longitudinal dimension, a grass cutting blade positioned beneath said deck, a power unit mounted on the top of said deck for driving said blade, said power unit being centrally positioned on said deck proximately at the rear portion of the forward half of said deck, a generally U-shaped handle mounted to the rear half of said deck, said handle extending rearwardly from said mower at an angle of approximately 45 degress, a receptacle cover immovably mounted to said handle, said cover being vertically spaced above the rear half of said deck, said cover being generally square in top plan view, an inlet opening formed in one corner of said generally square cover at one side of said mower, a discharge opening formed in the top of said deck at the same side of said mower as said inlet opening, a generally vertical tube extending from said discharge opening to said inlet opening for conveying grass cut by said blade beneath said deck up through said discharge opening and then through said inlet opening to up against the underside of said cover, a grass catching generally square shaped box being directly positioned on the rear half of said deck behind said power unit and between opposite sides of said handle and opposite rear wheels of said mower and directly beneath said cover, said box being open at the top and directly slidable on said mower deck in drawer-like fashion in either direction of said longitudinal dimension whereby in the mounted position of said box on said mower said open top is closed by said cover, latch means for locking said box in cover closed position, said box being entirely removable from said mower upon disengagement of said latch means for emptying the contents of said box, and air-grass separator means formed on the underside of said cover, said separator means comprising an arcuate shaped discharge chute on the underside of cover, said discharge chute extending in an arc from said inlet opening across said cover to the side of said mower opposite to said inlet opening, said chute comprising a pair of spaced arcuate depending side walls integral with said cover and being closed along the top thereof by said cover and open at the bottom along the entire length thereof whereby an air-grass mix discharged up against said cover from said tube will be caused to swirl about said box to permit said grass of said mix to fall by gravity down into said box, and said discharge opening, tube, inlet opening, cover and box comprising a closed air system, said tube, cover and box being constructed from air impermeable plastic, and an air vent formed in said cover remote from said inlet opening for venting the air of said air-grass mix to the atmosphere, said vent being positioned in said cover to face in directions away from an operator positioned behind said mower, and said power unit having a rating of several Horsepower, said blade being sized to be fan acting and to cut a swath of about 1½ to 2 feet, the underside of said deck having a pair of spaced circular shaped depending integral skirts to define an annulus for moving grass cut by said blade in a circular direction and then into said discharge opening, air inlet vents formed in said deck, said air inlet vents being positioned between said power unit and annulus to increase the flow of air in said annulus to assist the blade in its fan action to air lift the cut grass up through said tube against the cover, and said box being sized to be lined by an air impermeable throw-away type plastic bag having a capacity of about 30 gallons.

* * * * *